US012431077B2

(12) United States Patent
Kim et al.

(10) Patent No.: US 12,431,077 B2
(45) Date of Patent: Sep. 30, 2025

(54) DISPLAY DEVICE AND DRIVING METHOD THEREOF

(71) Applicant: DB GlobalChip Co., Ltd., Seongnam-si (KR)

(72) Inventors: Kyung Hwan Kim, Seongnam-si (KR); Sung Tak Yoon, Seongnam-si (KR); Shin Yoon, Seongnam-si (KR); Chang Hee Shin, Seongnam-si (KR)

(73) Assignee: DB GlobalChip Co., Ltd., Seongnam-si (KR)

( * ) Notice: Subject to any disclaimer, the term of this patent is extended or adjusted under 35 U.S.C. 154(b) by 0 days.

(21) Appl. No.: 19/004,896

(22) Filed: Dec. 30, 2024

(65) Prior Publication Data

US 2025/0225920 A1 Jul. 10, 2025

(30) Foreign Application Priority Data

Jan. 8, 2024 (KR) ........................ 10-2024-0002882

(51) Int. Cl.
*G09G 3/32* (2016.01)

(52) U.S. Cl.
CPC ......... *G09G 3/32* (2013.01); *G09G 2330/021* (2013.01)

(58) Field of Classification Search
CPC ........... G09G 2330/021; G09G 3/3241; G09G 3/3233; G09G 3/32
See application file for complete search history.

(56) References Cited

U.S. PATENT DOCUMENTS

2005/0200653 A1* 9/2005 Silverbrook ........... B41J 2/1648 348/E5.055
2010/0097360 A1* 4/2010 Cho ....................... G09G 3/325 345/205
2013/0334979 A1* 12/2013 Nathan .................. H05B 45/60 315/240
2023/0005419 A1* 1/2023 Lee .......................... G09G 3/32

FOREIGN PATENT DOCUMENTS

KR 10-173942 B1 4/1999
KR 10-1942466 B1 4/2019
KR 10-2060749 B1 12/2019
KR 10-2023-0038261 A 3/2023

* cited by examiner

*Primary Examiner* — Muhammad N Edun
(74) *Attorney, Agent, or Firm* — Knobbe, Martens, Olson & Bear, LLP

(57) ABSTRACT

A display device is proposed. The device may include a pixel array including n pixel groups, a reference current source including a first reference transistor through which a reference current flows and connected to the pixel array, and n sub-current sources each included in the n pixel groups and each including a first transistor connected to the reference current source, and n pixel circuits connected to the n sub-current sources, respectively. The reference current source may include any one of a second reference transistor and a reference resistor connected to the first reference transistor. Each of the n sub-current sources may provide a first mirroring current, and each of the n pixel circuits may provide a second mirroring current obtained by mirroring the first mirroring current. Each of the n sub-current sources may include any one of an additional transistor and an additional resistor connected to the first transistor.

35 Claims, 17 Drawing Sheets

DISPLAY DEVICE AND DRIVING METHOD THEREOF

CROSS-REFERENCE TO RELATED APPLICATION

This application claims priority under 35 U.S.C § 119 to Korean Patent Application No. 10-2024-0002882 filed on Jan. 8, 2024, in the Korean Intellectual Property Office, the entire contents of which are hereby incorporated by reference.

BACKGROUND

Technical Field

The disclosure relates to a display device and a driving method thereof.

Description of Related Technology

The contents set forth in this section merely provide background information on the present embodiment and do not constitute the prior art.

Recently, as the use of LEDoS is increased, interest in implementation of LEDoS technology is being increased. In order to implement the LEDoS technology, a current source is required to control the light emission of each of a plurality of pixels included in the LEDoS.

SUMMARY

One aspect is a display device and a driving method thereof, which can reduce the influence of resistance that is caused by common voltages.

Another aspect is a display device and a driving method thereof, which can lower a voltage required to drive a light-emitting element when an additional element is additionally disposed to reduce the influence of resistance that is caused by common voltages.

Another aspect is a display device and a driving method thereof, wherein a plurality of pixels in a pixel array are grouped, and a current mirroring the reference current is supplied to each pixel group.

Another aspect is a display device and a driving method thereof, which can provide current obtained by mirroring a reference current through inclusion of sub-current sources in each of pixel groups.

The aspects of the present disclosure are not limited to those disclosed herein, and other aspects and advantages of the present disclosure that have not been mentioned can be understood by the following description and will be more clearly understood by the embodiments of the present disclosure. Further, it will be readily appreciated that the aspects and advantages of the present disclosure may be realized by the means set forth in the claims and combinations thereof.

Another aspect is a display device that comprises, a pixel array including n pixel groups, a reference current source including a first reference transistor through which a reference current flows and connected to the pixel array, n sub-current sources each included in the n pixel groups and each including a first transistor connected to the reference current source, and n pixel circuits connected to the n sub-current sources, respectively, wherein the reference current source includes any one of a second reference transistor and a reference resistor connected to the first reference transistor, wherein each of the n sub-current sources provides a first mirroring current obtained by mirroring the reference current, wherein each of the n pixel circuits provides a second mirroring current obtained by mirroring the first mirroring current, wherein each of the n sub-current sources includes any one of an additional transistor and an additional resistor connected to the first transistor, and wherein n is a natural number.

According to some aspects, one end of the second reference transistor is connected to the first reference transistor, wherein a gate of the second reference transistor is connected to the other end of the second reference transistor, wherein one end of the additional transistor is connected to the first transistor, and wherein a gate of the additional transistor is connected to the other end of the additional transistor.

According to some aspects, each of the n pixel groups comprises at least one light-emitting element, and wherein the at least one light-emitting element of each of the n pixel groups is connected to each of the n pixel circuits.

According to some aspects, the second mirroring current is provided to each of the at least one light-emitting element.

According to some aspects, a first pixel group among the n pixel groups comprises a first sub-current source among the n sub-current sources and a first pixel circuit among the n pixel circuit, wherein the first sub-current source includes a second transistor connected to one end of the first transistor, wherein the first pixel circuit further includes at least one third transistor which is connected to the second transistor and which provides the second mirroring current, and wherein the first transistor is configured to provide the first mirroring current.

According to some aspects, the first pixel group comprises at least one light-emitting element connected to each of the at least one third transistor and provided with the second mirroring current.

According to some aspects, the first transistor comprises a plurality of first sub-transistors connected in series to each other, wherein the second transistor includes a plurality of second sub-transistors connected in series to each other, and wherein each of the at least one third transistor includes at least one third sub-transistor connected in series to each other.

According to some aspects, the first pixel group comprises at least one light-emitting element connected to each of the at least one third transistor and provided with the second mirroring current, and wherein a first light-emitting element included in the at least one light-emitting element is connected to the at least one third sub-transistor and is provided with the second mirroring current.

According to some aspects, a capacitor connected to a gate of the second transistor and a gate of the at least one third transistor; and a switch between the first transistor and the second transistor.

According to some aspects, the switch is changed from a closed state to an open state after the capacitor is charged by using the second mirroring current.

According to some aspects, a trimming circuit that enables an additional current as much as a difference between the reference current and the first mirroring current to be supplied to the first transistor.

Another aspect is a display device that comprises, a first pixel circuit connected to a first light-emitting element group, a first sub-current source connected to the first pixel circuit; a second pixel circuit connected to a second light-emitting element group, a second sub-current source connected to the second pixel circuit; and a reference current source including a first reference transistor through which a reference current flows and which is connected to each of the first sub-current source and the second sub-current source, wherein each of the first sub-current source and the second sub-current source includes a first transistor connected to the first reference transistor and provides a first mirroring current obtained by mirroring the reference current, wherein each of the first pixel circuit and the second pixel circuit provides a second mirroring current obtained by mirroring the first mirroring current, wherein the reference current source includes any one of a second reference transistor and a reference resistor connected to the first reference transistor, and wherein each of the first sub-current source and the second sub-current source includes any one of an additional transistor and an additional resistor connected to the first transistor.

According to some aspects, one end of the second reference transistor is connected to the first reference transistor, wherein a gate of the second reference transistor is connected to the other end of the second reference transistor, wherein one end of the additional transistor is connected to the first transistor, and wherein a gate of the additional transistor is connected to the other end of the additional transistor.

According to some aspects, each of the first light-emitting element group and the second light-emitting element group comprises at least one light-emitting element.

According to some aspects, the second mirroring current is provided to each of the at least one light-emitting element.

According to some aspects, each of the first sub-current source and the second sub-current source comprises a second transistor connected to one end of the first transistor, wherein each of the first pixel circuit and the second pixel circuit further includes at least one third transistor which is connected to the second transistor and which provides the second mirroring current, and wherein the first transistor is configured to provide the first mirroring current.

According to some aspects, each of the first light-emitting element group and the second light-emitting element group comprises at least one light-emitting element connected to each of the at least one third transistor and provided with the second mirroring current.

According to some aspects, the first transistor comprises a plurality of first sub-transistors connected in series to each other, wherein the second transistor includes a plurality of second sub-transistors connected in series to each other, and wherein each of the at least one third transistor includes at least one third sub-transistor connected in series to each other.

According to some aspects, each of the first light-emitting element group and the second light-emitting element group comprises at least one light-emitting element connected to each of the at least one third transistor and provided with the second mirroring current, and wherein a first light-emitting element included in the at least one light-emitting element is connected to the at least one third sub-transistor and is provided with the second mirroring current.

According to some aspects, a capacitor connected to a gate of the second transistor and a gate of the at least one third transistor; and a switch between the first transistor and the second transistor.

According to some aspects, the switch is changed from a closed state to an open state after the capacitor is charged by using the second mirroring current.

According to some aspects, a trimming circuit that enables an additional current as much as a difference between the reference current and the first mirroring current to be supplied to the first transistor.

Another aspect is a display device that comprises, a pixel array including n pixel groups, a reference current source including a first reference transistor through which a reference current flows and which is connected to the pixel array, n sub-current sources each included in the n pixel groups and each including a first transistor connected to the reference current source; and n pixel circuits included in each of the n pixel groups and connected to the n sub-current sources, respectively, wherein the reference current source includes any one of a second reference transistor and a reference resistor connected to the first reference transistor, wherein each of the n sub-current sources includes: the first transistor that forms a first current mirror together with the first reference transistor, and any one of an additional transistor and an additional resistor connected to the first transistor, and wherein each of the n sub-current sources or each of the n pixel circuits includes a second current mirror connected to the first transistor.

According to some aspects, one end of the second reference transistor is connected to the first reference transistor, wherein a gate of the second reference transistor is connected to the other end of the second reference transistor, wherein one end of the additional transistor is connected to the first transistor, and wherein a gate of the additional transistor is connected to the other end of the additional transistor.

According to some aspects, the second current mirror comprises: a second transistor connected to one end of the first transistor; and at least one third transistor connected to the second transistor.

According to some aspects, each of the n pixel groups comprises at least one light-emitting element connected to each of the at least one third transistor.

According to some aspects, the first transistor comprises a plurality of first sub-transistors connected in series to each other, wherein the second transistor includes a plurality of second sub-transistors connected in series to each other, and wherein each of the at least one third transistor includes at least one third sub-transistor connected in series to each other.

According to some aspects, a capacitor connected to a gate of the second transistor and a gate of the at least one third transistor; and a switch between the first transistor and the second transistor.

According to some aspects, the switch is changed from a closed state to an open state after the capacitor is charged by using the second mirroring current.

According to some aspects, a first mirroring current obtained by mirroring the reference current is provided to the first transistor and the second current mirror by the first current mirror, and wherein a second mirroring current obtained by mirroring the first mirroring current is generated by the second current mirror.

According to some aspects, each of the n pixel groups comprises at least one light-emitting element, wherein the at least one light-emitting element of each of the n pixel groups is connected to the second current mirror, and wherein the second mirroring current is provided to the at least one light-emitting element.

According to some aspects, a trimming circuit that enables an additional current as much as a difference between the reference current and the first mirroring current to be supplied to the first transistor.

Another aspect is a method for driving a display device, comprising the steps of providing a first mirroring current obtained by mirroring a reference current to a first transistor connected to a reference current source through which the reference current flows and an additional circuit connected to the first transistor; and providing a second mirroring current obtained by mirroring the first mirroring current to at least one third transistor by using a second transistor which is connected to the first transistor and through which the first mirroring current flows and the at least one third transistor connected to the second transistor, wherein the additional circuit includes any one of an additional transistor and an additional resistor.

According to some aspects, the step of connecting one end of the additional transistor to the first transistor and connecting a gate of the additional transistor to the other end of the additional transistor.

According to some aspects, the steps of charging a capacitor connected to a gate of the second transistor and a gate of the at least one third transistor by using the second mirroring current in a state where a switch between the first transistor and the second transistor is closed; and changing the switch to an open state after charging the capacitor.

The display device and the driving method thereof according to the present disclosure can minimize an error between the current that is provided to each of at least one pixel and a reference current by reducing the number of times the reference current is mirrored through inclusion of sub-current sources in each of pixel groups.

Further, the display device and the driving method thereof according to the present disclosure can reduce the influence of resistance that is caused by common voltages through further inclusion of an additional element in each of a reference current source and a sub-current source.

Further, the display device and the driving method thereof according to the present disclosure can lower a voltage required to drive a light-emitting element by further disposing an additional element in order to reduce the influence of resistance that is caused by common voltages.

Further, the display device and the driving method thereof according to the present disclosure can provide a mirroring current with a minimized error from a reference current to a light-emitting element by grouping a plurality of pixels of a pixel array, and mirroring and providing the reference current with respect to a pixel group including the plurality of pixels, instead of mirroring (i.e., copying) the reference current with respect to each of the plurality of pixels.

In addition to what is described above, specific effects of the present disclosure will be described together while illustrating the following specific details for carrying out the present disclosure.

DETAILED DESCRIPTION

Figure 1:
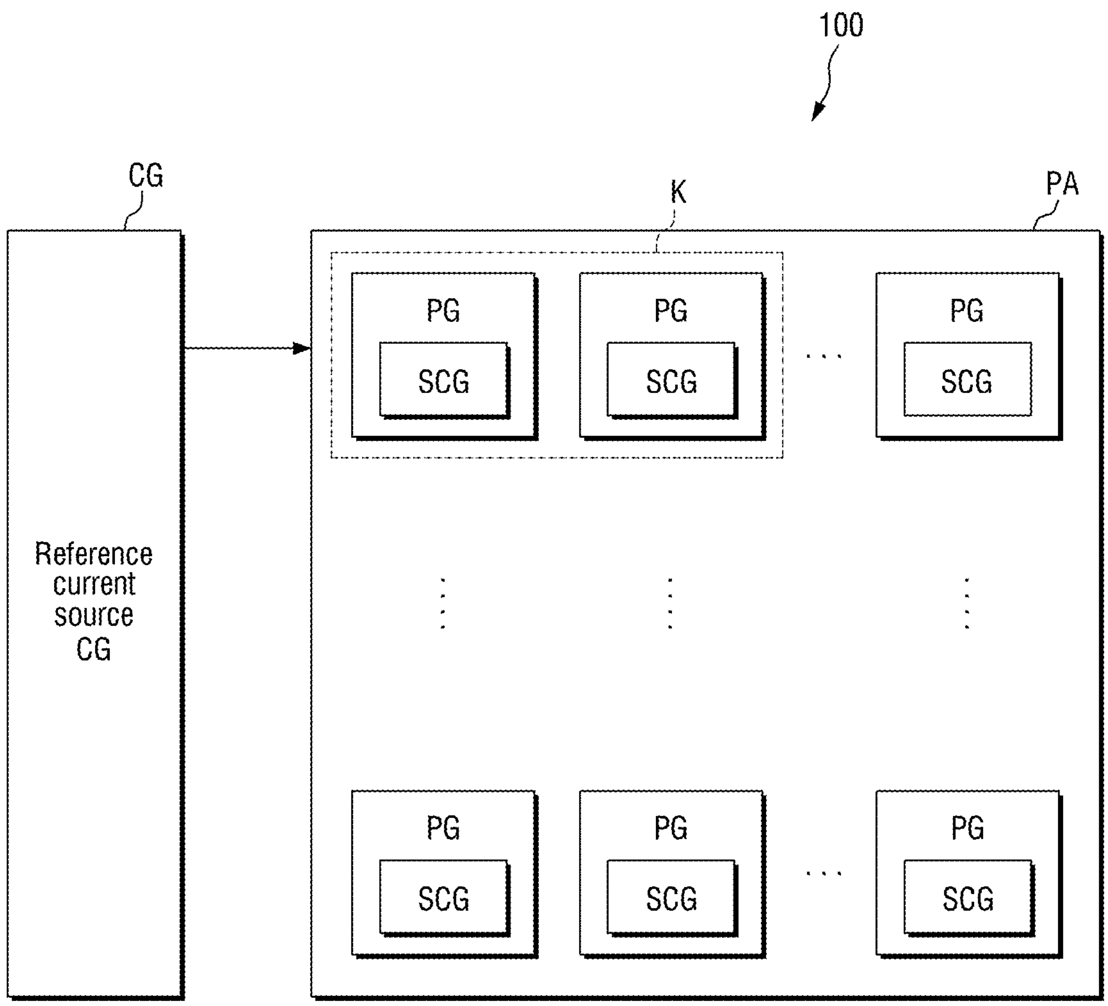
FIG. 1 is a diagram explaining a display device according to some embodiments of the present disclosure.

A micro LED that may be included in the LEDoS may have a problem in that the gray scale is changed depending on the change of current. In order to supplement this, the current amounts of current sources that are generated for each of the plurality of pixels are all required to match each other.

Since a voltage drop occurs when the amount of current is changed, there has been a need for a technology capable of ensuring the current that is provided to each of the plurality of pixels included in LEDoS to be equal to the current by the current sources.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, with reference to FIGS. 1 to 17, a display device and a driving method thereof according to embodiments of the present disclosure will be described.

FIG. 1 is a diagram explaining a display device according to some embodiments of the present disclosure.

Referring to FIG. 1, a display device 100 according to some embodiments of the present disclosure may include a reference current source CG and a pixel array PA.

In addition to what is illustrated in the drawing, the display device 100 may further include a clock generating unit that provides a clock signal to a pixel array PA and a data driving unit that provides data.

The reference current source CG may be connected to the pixel array PA and may provide reference current to each of n pixel groups PG.

The pixel array PA may include n pixel groups PG (where, n is a natural number). The pixel array PA may include n sub-current sources SCG and n pixel circuits PXC. Each of the n pixel groups PG may include a sub-current source SCG. The sub-current source SCG may be connected to the reference current source.

Each of the n pixel groups PG may include at least one pixel. The pixel may include, for example, a transistor and one light-emitting element. Each of the n pixel groups PG may include at least one light-emitting element. For example, each of the n pixel groups PG may include one pixel and one light-emitting element included in the pixel. Alternatively, each of the n pixel groups PG may include, for example, a plurality of pixels and a plurality of light-emitting elements included in the plurality of pixels, respectively.

The at least one light-emitting element may be provided as a separate substrate from a driving circuit substrate on which the reference current source CG and the n sub-current sources SCG are disposed. For example, separately from the driving circuit substrate, a light-emitting element array may be provided. The light-emitting element array may include a plurality of light-emitting elements. One pixel group PG may include one of the plurality of light-emitting elements, or may include a light-emitting element group into which one or more of the plurality of light-emitting elements are grouped. The at least one light-emitting element included in each of n pixel groups PG may be connected to each of the n sub-current sources SCG.

Figure 2:
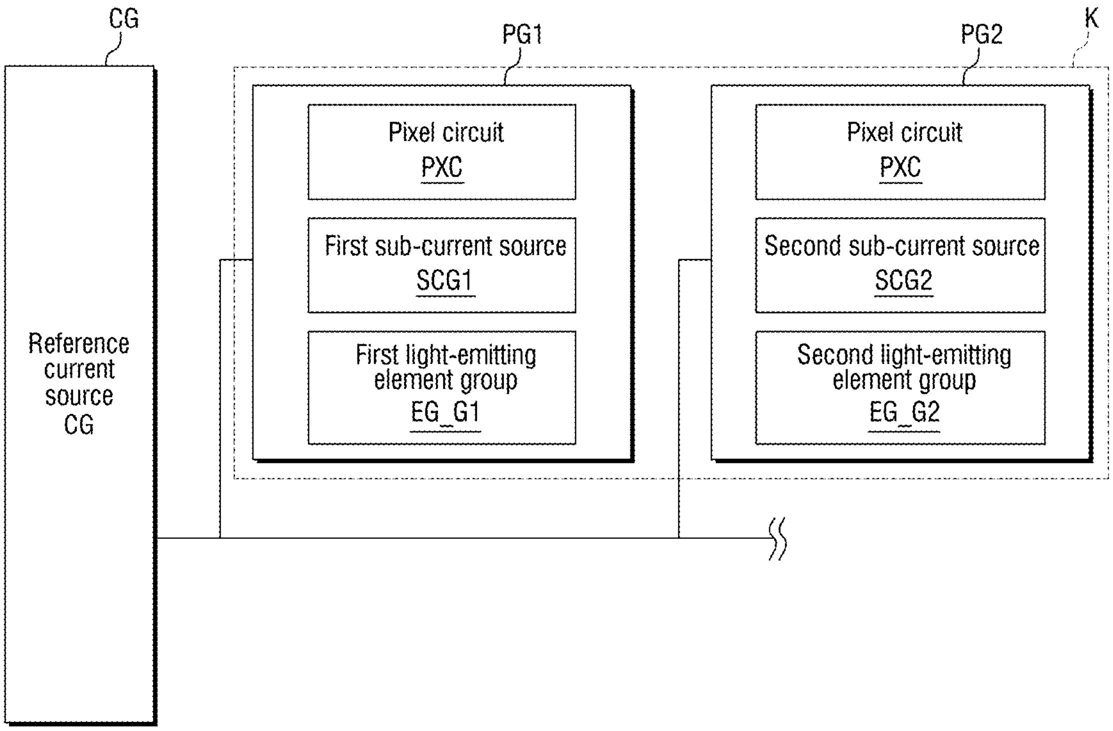
FIG. 2 is an enlarged diagram of K in FIG. 1.

FIG. 2 is an enlarged diagram of K in FIG. 1.

Referring to FIGS. 1 and 2, the n pixel groups PG may include a first pixel group PG1 and a second pixel group PG2. Each of the n pixel groups PG may include the same structure.

The first pixel group PG1 may include a first sub-current source SCG1, a pixel circuit PXC, and a first light-emitting element group ED_G1. The first light-emitting element group ED_G1 may be provided as a separate substrate from the substrate on which the first sub-current source SCG1 is disposed. The first light-emitting element group ED_G1 may include at least one light-emitting element. The first sub-current source SCG1, the pixel circuit PXC, and the first light-emitting element group ED_G1 may be electrically connected to each other. The first sub-current source SCG1 may be electrically connected to the reference current source CG.

The second pixel group PG2 may include a second sub-current source SCG2, a pixel circuit PXC, and a second light-emitting element group ED_G2. The second light-emitting element group ED_G2 may be provided as a separate substrate from the substrate on which the second sub-current source SCG2 is disposed. The second light-emitting element group ED_G2 may include at least one light-emitting element. The second sub-current source SCG2, the pixel circuit PXC, and the second light-emitting element group ED_G2 may be electrically connected to each other. The second sub-current source SCG2 may be electrically connected to the reference current source CG.

Figure 3:
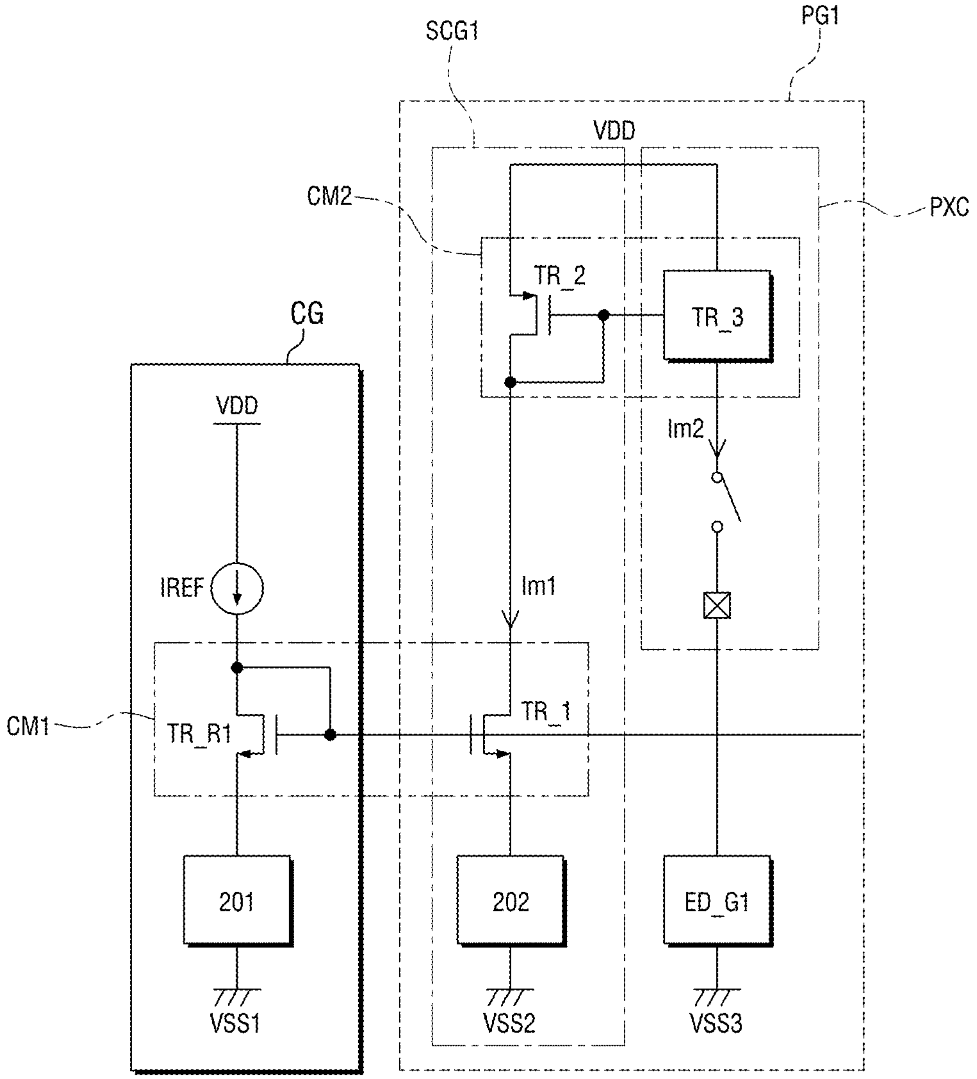
FIG. 3 is a diagram explaining a display device according to some embodiments of the present disclosure, and illustrates a circuit diagram that corresponds to the reference current source and the first pixel group of FIG. 2.

FIG. 3 is a diagram explaining a display device according to some embodiments of the present disclosure, and illustrates a circuit diagram that corresponds to the reference current source and the first pixel group of FIG. 2. The explanation of the first pixel group PG1 may be applied to other pixel groups including the second pixel group PG2 (of FIG. 2).

Referring to FIGS. 1, 2, and 3, each of n sub-current sources SCG may provide a first mirroring current Im1, and each of n pixel circuits PXC may provide a second mirroring current Im2. The first mirroring current Im1 may be the current obtained by mirroring a reference current IREF. The second mirroring current Im2 may be the current obtained by mirroring the first mirroring current Im1. The reference current IREF, the first mirroring current Im1, and the second mirroring current Im2 may be the current having substantially the same current amount within an error range.

The second mirroring current Im2 may be provided to each of at least one light-emitting element included in each of the n pixel groups PG.

The reference current source CG may include a first reference transistor TR_R1 through which the reference current IREF flows and which is connected to the pixel array PA. One end of the first reference transistor TR_R1 may be connected to a power VDD, and the other end thereof may be connected to a first additional circuit 201. The first reference transistor TR_R1 may form a first current mirror CM1 together with a first transistor TR_1 included in each of the n sub-current sources SCG.

Each of the n sub-current sources SCG may include the first transistor TR_1. The first transistor TR_1 may be connected to the reference current source CG, and may provide the first mirroring current Im1 obtained by mirroring the reference current IREF. One end of the first transistor TR_1 may be connected to a second transistor TR_2, and the other end of the first transistor TR_1 may be connected to a second additional circuit 202.

For example, the first sub-current source SCG1 of the first pixel group PG1 may include the first transistor TR_1 that forms the first current mirror CM1 together with the first reference transistor TR_R1. Due to the first current mirror CM1, the first mirroring current Im1 obtained by mirroring the reference current IREF may be generated.

Each of the n sub-current sources SCG may include the second transistor TR_2. Each of the n sub-current sources SCG may include a second current mirror CM2 that is connected to the first transistor TR_1. One end of the second transistor TR_2 may be connected to the power VDD, and the other thereof may be connected to one end of the first transistor TR_1. The first mirroring current Im1 may flow through the second transistor TR_2.

Each of the n pixel circuits PXC may include at least one third transistor TR_3. The at least one third transistor TR_3 may be connected to the second transistor TR_2, and may provide the second mirroring current Im2 that is obtained by mirroring the first mirroring current Im1. One end of each of the at least one third transistor TR_3 may be connected to the power VDD, and the other end thereof may be connected to a light-emitting element group (e.g., first light-emitting element group ED_G1) included in each of the n sub-current sources SCG. The second mirroring current Im2 may be provided to each of the at least one light-emitting element included in the light-emitting element group. Each of the at least one light-emitting element included in the light-emitting element group included in one pixel group may be connected to each of the at least one third transistor TR_3.

For example, the first sub-current source SCG1 and the pixel circuit PXC of the first pixel group PG1 may include the second current mirror CM2 that is connected to the first transistor TR_1. The second current mirror CM2 may include the second transistor TR_2 connected to one end of the first transistor TR_1 and the at least one third transistor TR_3 connected to the second transistor TR_2. By the second current mirror CM2, the second mirroring current Im2 that is obtained by mirroring the first mirroring current Im1 may be formed. The second mirroring current Im2 may be provided to each of the at least one light-emitting element included in the first light-emitting element group ED_G1.

In some embodiments, the first reference transistor TR_R1 and the first transistor TR_1 may be NMOS transistors, and the second transistor TR_2 and the at least one third transistor TR_3 may be PMOS transistors.

The one third transistor TR_3 and the one light-emitting element may constitute one pixel. Each of the n pixel groups PG may include at least one pixel and one sub-current source.

Since the display device 100 according to some embodiments of the present disclosure further includes the second current mirror CM2 for mirroring the first mirroring current Im1 in addition to the first current mirror CM1 for mirroring the reference current IREF, the disposition interval between the second transistor and the third transistor for mirroring can be reduced, and thus the error between the first mirroring current Im1 and the second mirroring current Im2 can be reduced.

Figure 4:
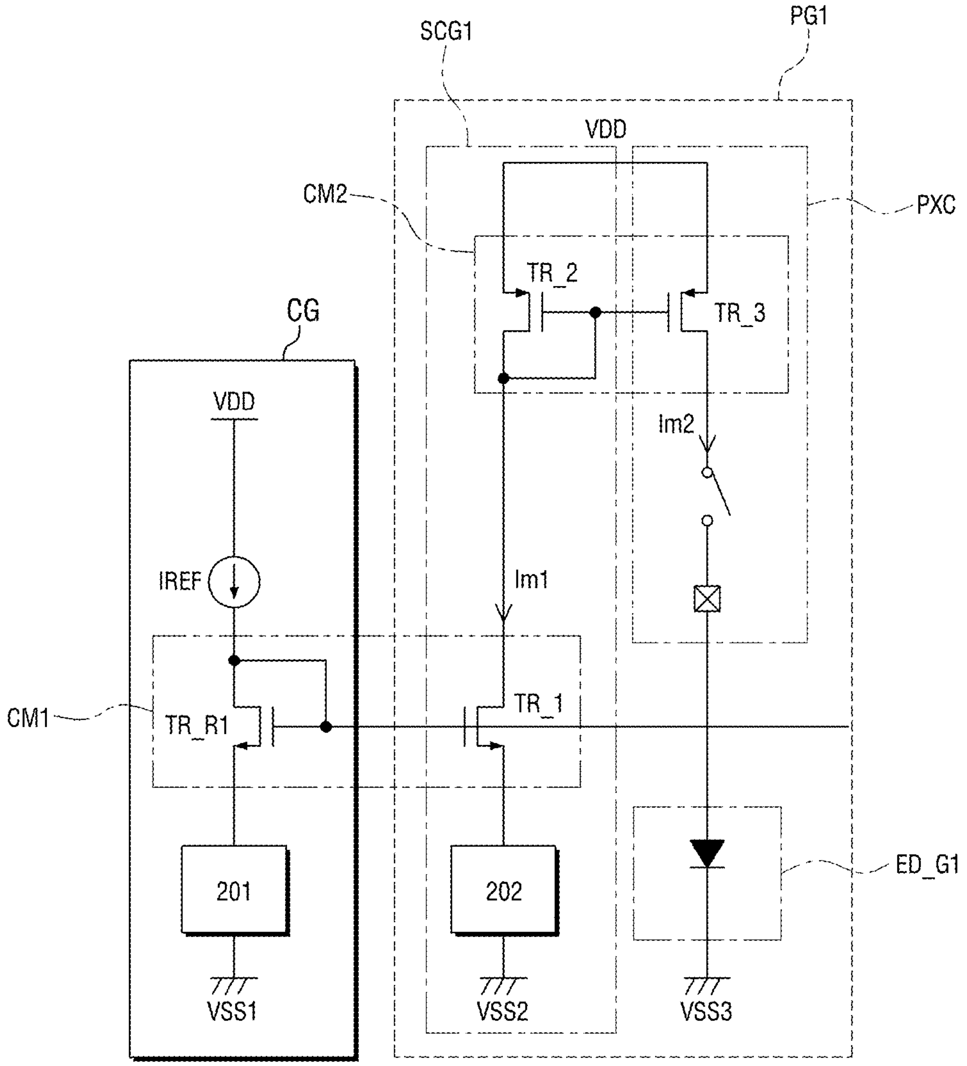
FIG. 4 is a diagram explaining the first light-emitting element group and at least one third transistor of FIG. 3.

FIG. 4 is a diagram explaining the first light-emitting element group and at least one third transistor of FIG. 3.

Referring to FIGS. 3 and 4, the first light-emitting element group ED_G1 may include one light-emitting element. Accordingly, the one light-emitting element may be connected to the one third transistor TR_3. For example, the number of third transistors TR_3 may be equal to the number of light-emitting elements included in the light-emitting element group connected to each of the n pixel circuits PXC.

Figure 5:
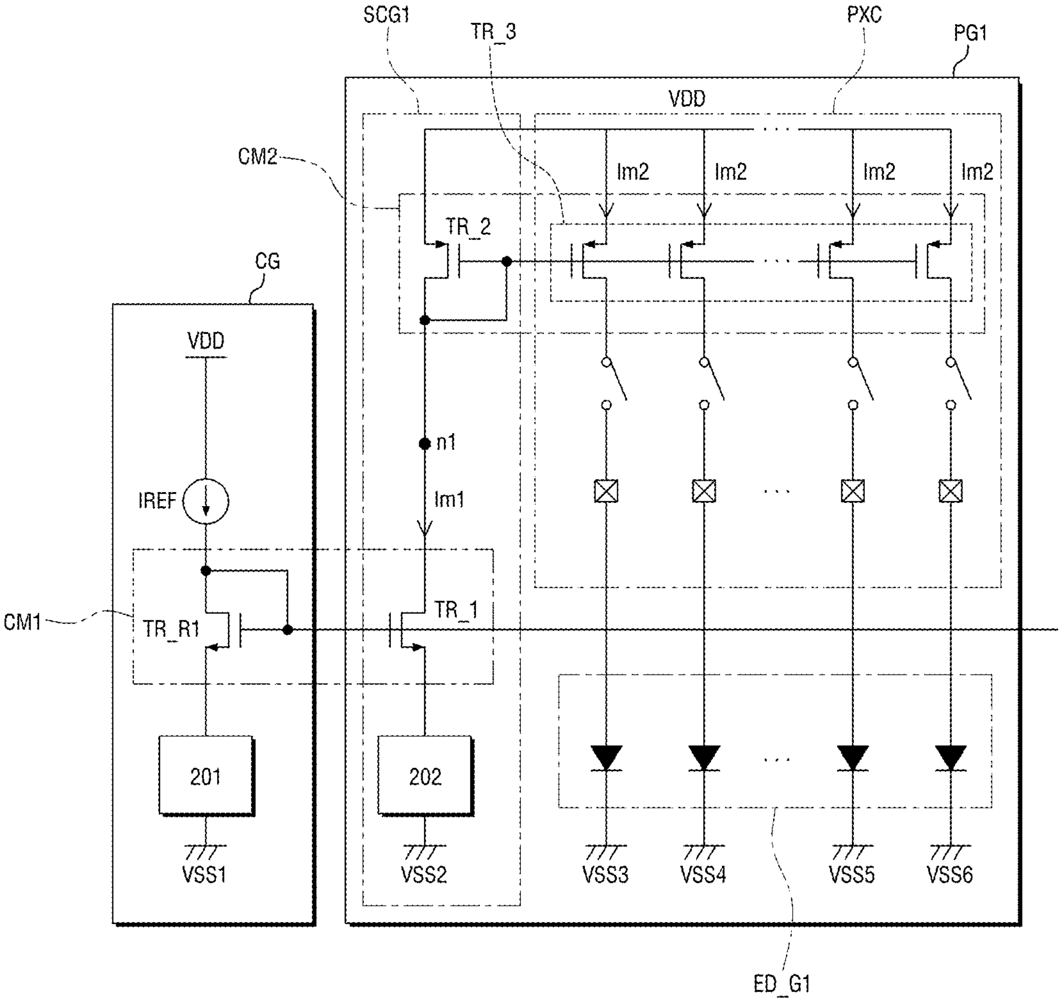
FIG. 5 is a diagram explaining the first light-emitting element group and at least one third transistor of FIG. 3.

FIG. 5 is a diagram explaining the first light-emitting element group and at least one third transistor of FIG. 3.

Referring to FIGS. 3 and 5, the first light-emitting element group ED_G1 may include a plurality of light-emitting elements. Accordingly, each of the plurality of light-emitting elements may be connected to each of the plurality of third transistors TR_3. For example, one pixel group (e.g., PG1) may include a plurality of pixels. The second mirroring current Im2 may flow through each of the plurality of third transistors TR_3 and each of the plurality of light-emitting elements.

The display device 100 according to some embodiments of the present disclosure can reduce the number of times the reference current IREF is mirrored with respect to the pixel array PA of FIG. 1 and thus can reduce the error between the reference current IREF and the mirrored current by disposing one sub-current source SCG for one pixel group PG that groups the plurality of pixels, instead of including the sub-current source for each pixel.

Figure 6:
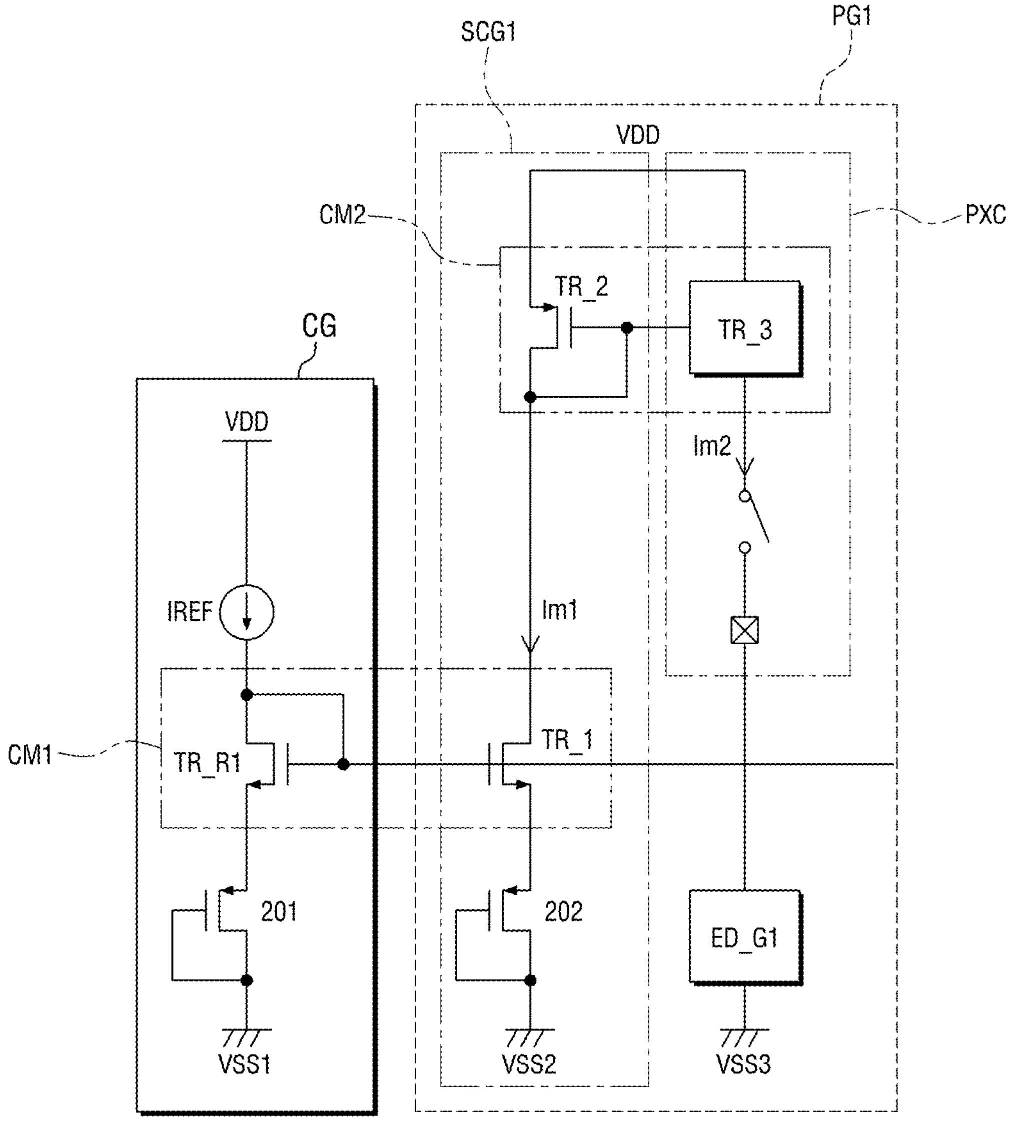
FIG. 6 is a diagram explaining a first additional circuit and a second additional circuit of FIG. 3.

FIG. 6 is a diagram explaining a first additional circuit and a second additional circuit of FIG. 3.

Referring to FIGS. 3 and 6, each of the first additional circuit 201 and the second additional circuit 202 may include a transistor.

The first additional circuit 201 may include the second reference transistor. One end of the second reference transistor may be connected to the first reference transistor TR_R1, and the gate of the second reference transistor may be connected to the other end of the second reference transistor. The other end of the second reference transistor may be connected to a first common voltage VSS1. In case that the first reference transistor TR_R1 is an NMOS transistor, the second reference transistor may be a PMOS transistor. The second reference transistor may be a source follower.

The second additional circuit 202 may include an additional transistor. One end of the additional transistor may be connected to the first transistor TR_1, and the gate of the additional transistor may be connected to the other end of the additional transistor. The other end of the additional transistor may be connected to a second common voltage VSS2. In case that the first transistor TR_1 is an NMOS transistor, the additional transistor may be a PMOS transistor. The additional transistor may be a source follower.

Due to the additional transistor, it is possible to suppress the resistance that is caused by a plurality of common voltages (e.g., VSS1, VSS2, and VSS3) and to supplement the reduction of the intensity of the first mirroring current Im1.

At least one light-emitting element included in the first light-emitting element group ED_G1 and at least one third transistor TR_3 connected to at least one light-emitting element may include only one light-emitting element and only one third transistor (refer to FIG. 4), or may include a plurality of light-emitting elements and a plurality of third transistors, respectively (refer to FIG. 5).

Figure 7:
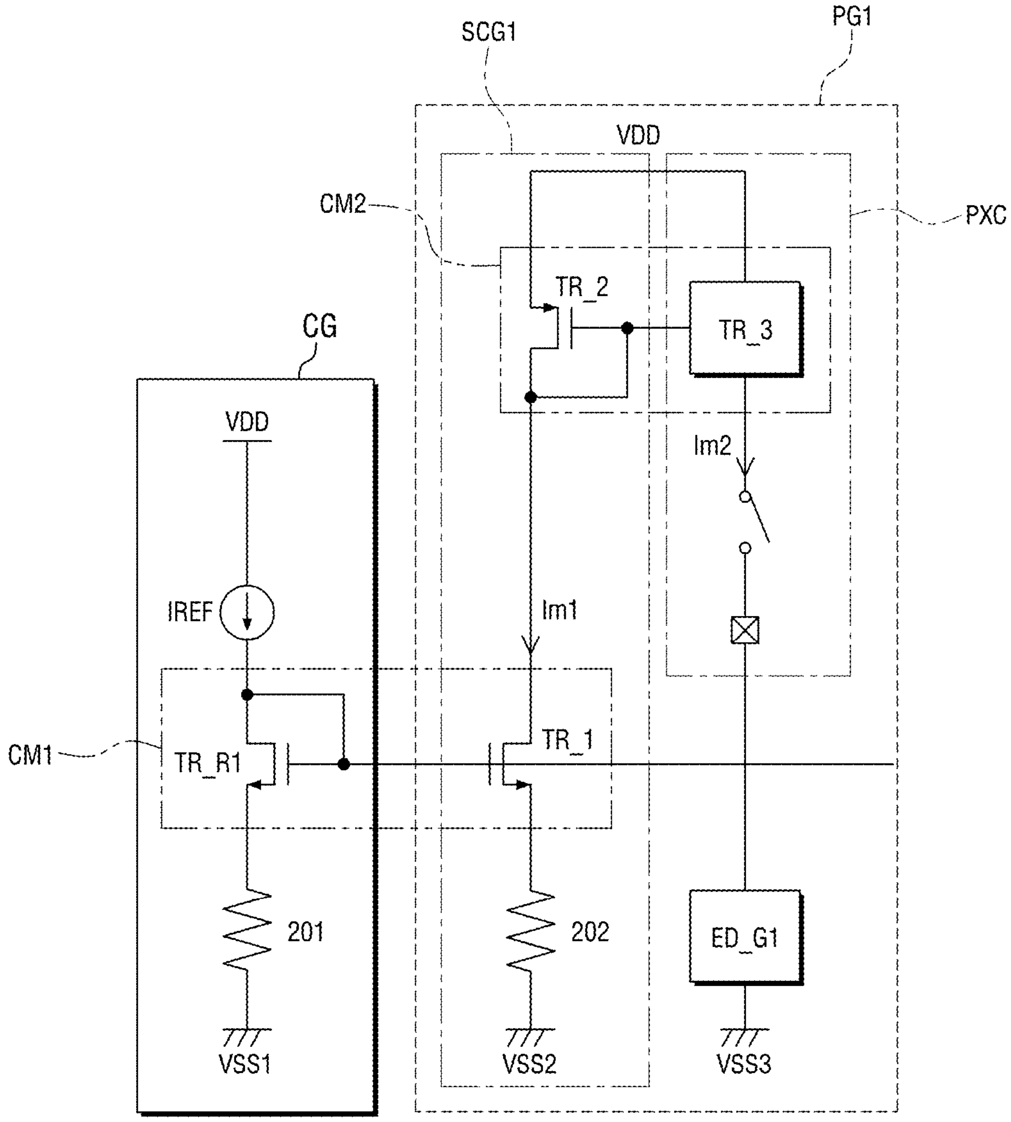
FIG. 7 is a diagram explaining a first additional circuit and a second additional circuit of FIG. 3.

FIG. 7 is a diagram explaining a first additional circuit and a second additional circuit of FIG. 3.

Referring to FIGS. 3 and 7, each of the first additional circuit 201 and the second additional circuit 202 may include a resistor.

The first additional circuit 201 may include a reference resistor. One end of the reference resistor may be connected to the first reference transistor TR_R1, and the other end of the reference resistor may be connected to the first common voltage VSS1.

The second additional circuit 202 may include an additional resistor. One end of the additional resistor may be connected to the first transistor TR_1, and the other end of the additional resistor may be connected to the second common voltage VSS2.

In case that each of the first additional circuit 201 and the second additional circuit 202 includes a resistor, a mismatch phenomenon related to a parasitic resistance can be suppressed.

Referring again to FIGS. 1, 2, and 3, the first common power VSS1 to the third common power VSS3 may be different from one another. The first common power VSS1 may be a ground voltage connected to the first additional circuit 201. The second common power VSS2 may be a ground voltage connected to the second additional circuit 202. The third common power VSS3 may be a ground voltage connected to each of at least one light-emitting element included in the first light-emitting element group ED_G1. Each of the first common power VSS1 to the third common power VSS3 may be connected to each other by a metal, and the resistance may occur by the connected metal.

If the reference current IREF is mirrored for each pixel in case that the first common power VSS1 to the third common power VSS3 are different from one another, a voltage drop may occur by the resistance, and thus the amount of current that is provided to the light-emitting element may be reduced.

Even if the first common power VSS1 to the third common power VSS3 are different from one another in a state where the same power VDD is applied to the display device 100 according to an embodiment of the present disclosure, the mirroring current Im2 that is substantially the same as the reference current IREF can be provided to each of the at least one light-emitting elements by using the two current mirrors CM1 and CM2. Through this, even if the first common power VSS1 to the third common power VSS3 are different from one another in a state where the same power VDD is applied to the display device 100 according to the embodiment of the present disclosure, the influence of the voltage drop can be reduced by the first additional circuit 201 and the second additional circuit 202. Further, in the display device 100 according to the embodiment of the present disclosure, since the second additional circuit 202 is disposed on a circuit branch different from that of the light-emitting element group, the light-emitting elements can be driven by using a low power, without considering the voltage required to driving the second additional circuit 202, and thus the power consumption can be reduced.

Figure 8:
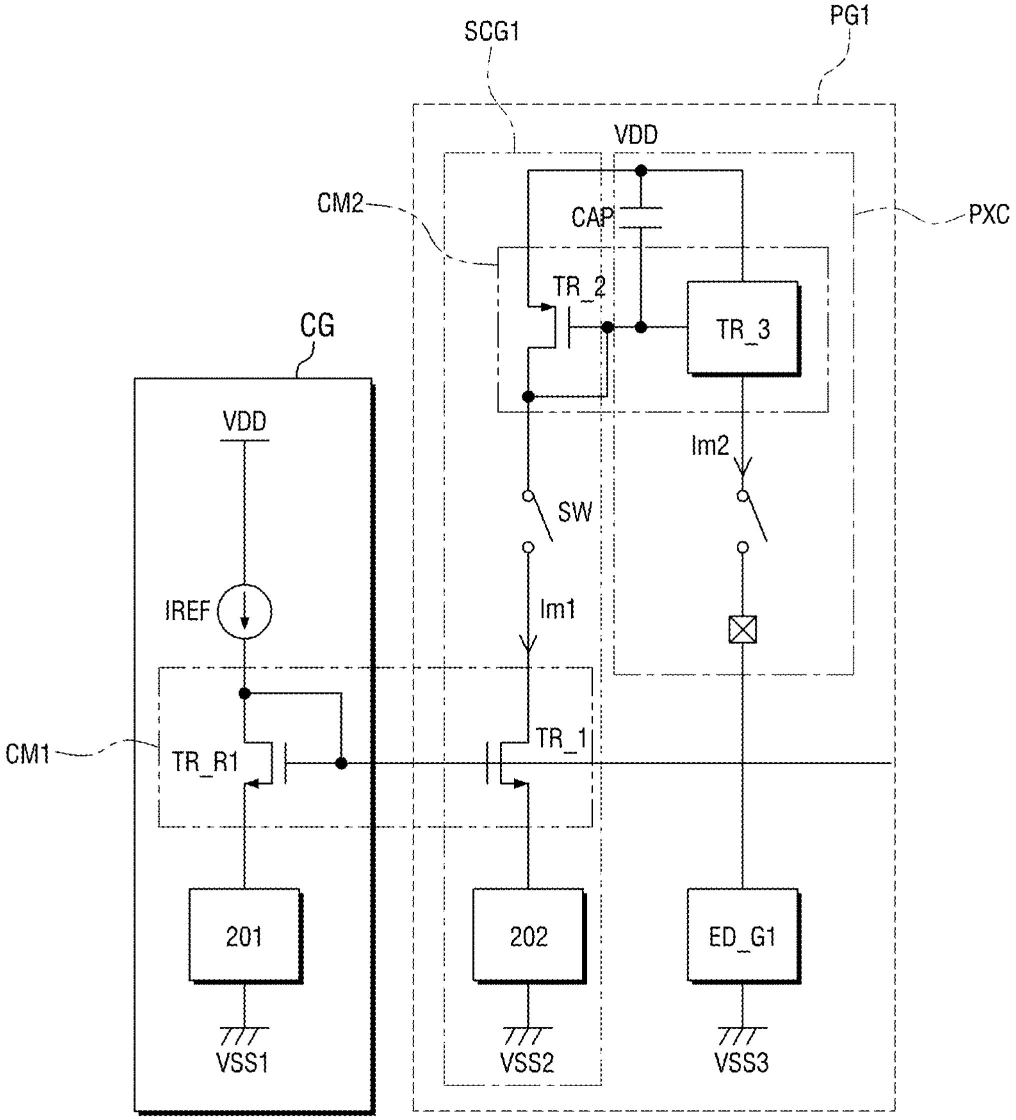
FIG. 8 is a diagram explaining a display device according to some embodiments of the present disclosure, and shows a circuit diagram corresponding to the reference current source and the first pixel group of FIG. 2.

FIG. 8 is a diagram explaining a display device according to some embodiments of the present disclosure, and shows a circuit diagram corresponding to the reference current source and the first pixel group of FIG. 2. For clarity of explanation, explanations that overlap with what was previously explained with reference to the drawings will be briefly explained or omitted.

Referring to FIGS. 1, 2, and 8, each of the n pixel circuits PXC of the display device 100 according to some embodiments of the present disclosure may further include a capacitor CAP, and each of the n sub-current sources SCG may further include a switch SW.

The capacitor CAP may be connected to the gate of the second transistor TR_2 and the gate of the at least one third transistor TR_3. For example, one end of the capacitor CAP may be connected to the power VDD, and the other end of the capacitor CAP may be connected to the gate of the second transistor TR_2 and the gate of the at least one third transistor TR_3.

The switch SW may be disposed between the first transistor TR_1 and the second transistor TR_2. For example, one end of the switch SW may be connected to the second transistor TR_2, and the other end of the switch SW may be connected to the first transistor TR_1.

Figure 9:
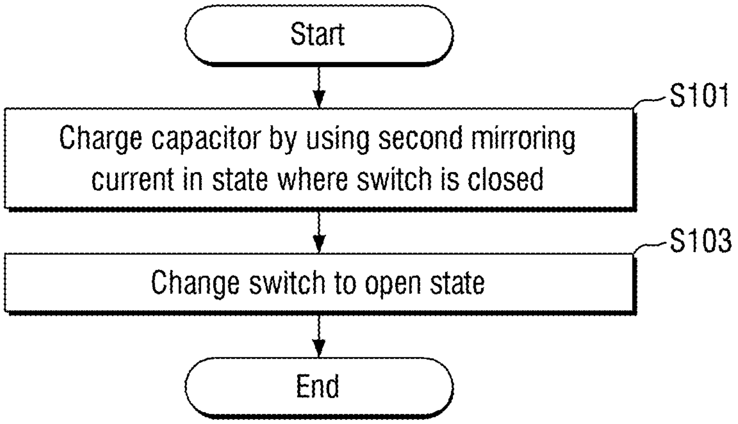
FIG. 9 is a diagram explaining an operation of the circuit of FIG. 8.

FIG. 9 is a diagram explaining an operation of the circuit of FIG. 8.

Referring to FIGS. 1, 2, 8, and 9, the capacitor CAP may be first charged by using the second mirroring current Im2 in a state where the switch SW is closed (S101). After the capacitor CAP is charged, the switch SW may be changed to an open state (S103).

In case that the reference current IREF is mirrored by using two current mirrors CM1 and CM2, the power consumption may be increased. After the voltage is applied by charging the capacitor CAP by using the second mirroring current Im2, the increased power consumption can be supplemented by changing the switch SW to the open state.

Each of the first additional circuit 201 and the second additional circuit 202 may include any one of a transistor and a resistor. At least one light-emitting element included in the first light-emitting element group ED_G1 and at least one third transistor TR_3 connected to at least one light-emitting element may include only one light-emitting element and only one third transistor (refer to FIG. 4), or may include a plurality of light-emitting elements and a plurality of third transistors, respectively (refer to FIG. 5).

Figure 10:
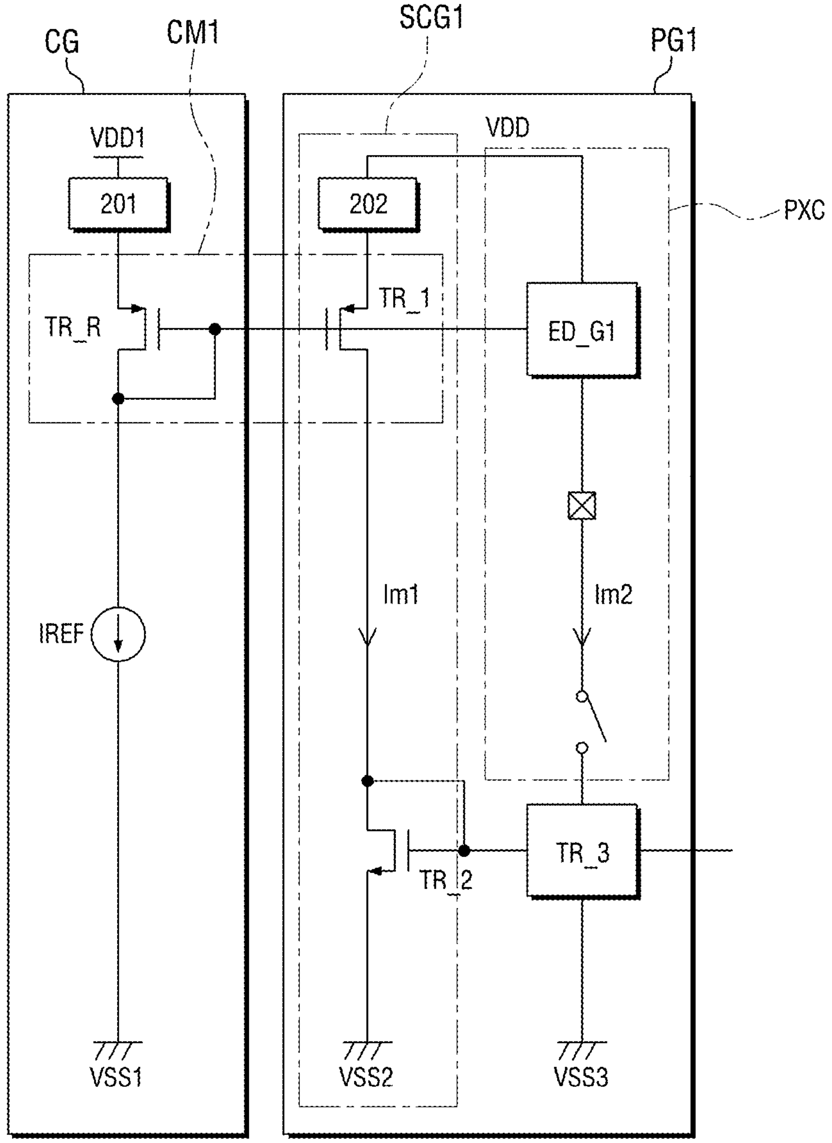
FIG. 10 is a diagram explaining a display device according to some embodiments of the present disclosure, and shows a circuit diagram corresponding to the reference current source and the first pixel group of FIG. 2.

FIG. 10 is a diagram explaining a display device according to some embodiments of the present disclosure, and shows a circuit diagram corresponding to the reference current source and the first pixel group of FIG. 2. For clarity of explanation, explanations that overlap with what was previously explained with reference to the drawings will be briefly explained or omitted.

Referring to FIGS. 1, 2, and 10, the first reference transistor TR_R1 and the first transistor TR_1 may be PMOS transistors. The second transistor TR_2 and the at least one third transistor TR_3 may be NMOS transistors. In case that each of the first additional circuit 201 and the second additional circuit 202 includes a transistor, the included transistor may be an NMOS transistor.

Figure 11:
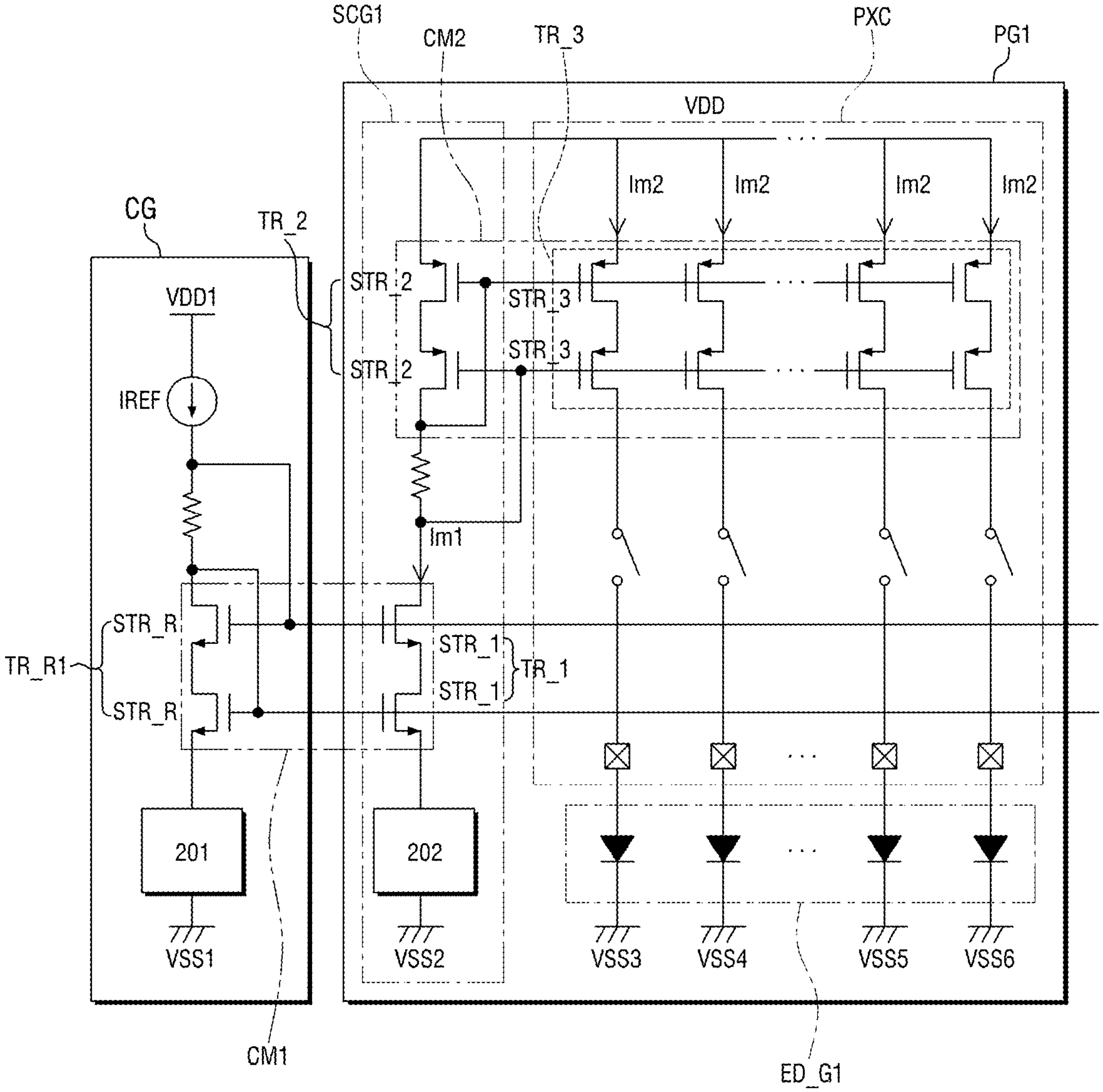
FIGS. 11 and 12 are diagrams explaining a display device according to some embodiments of the present disclosure, and show circuit diagrams corresponding to the reference current source and the first pixel group of FIG. 2.
Figure 12:
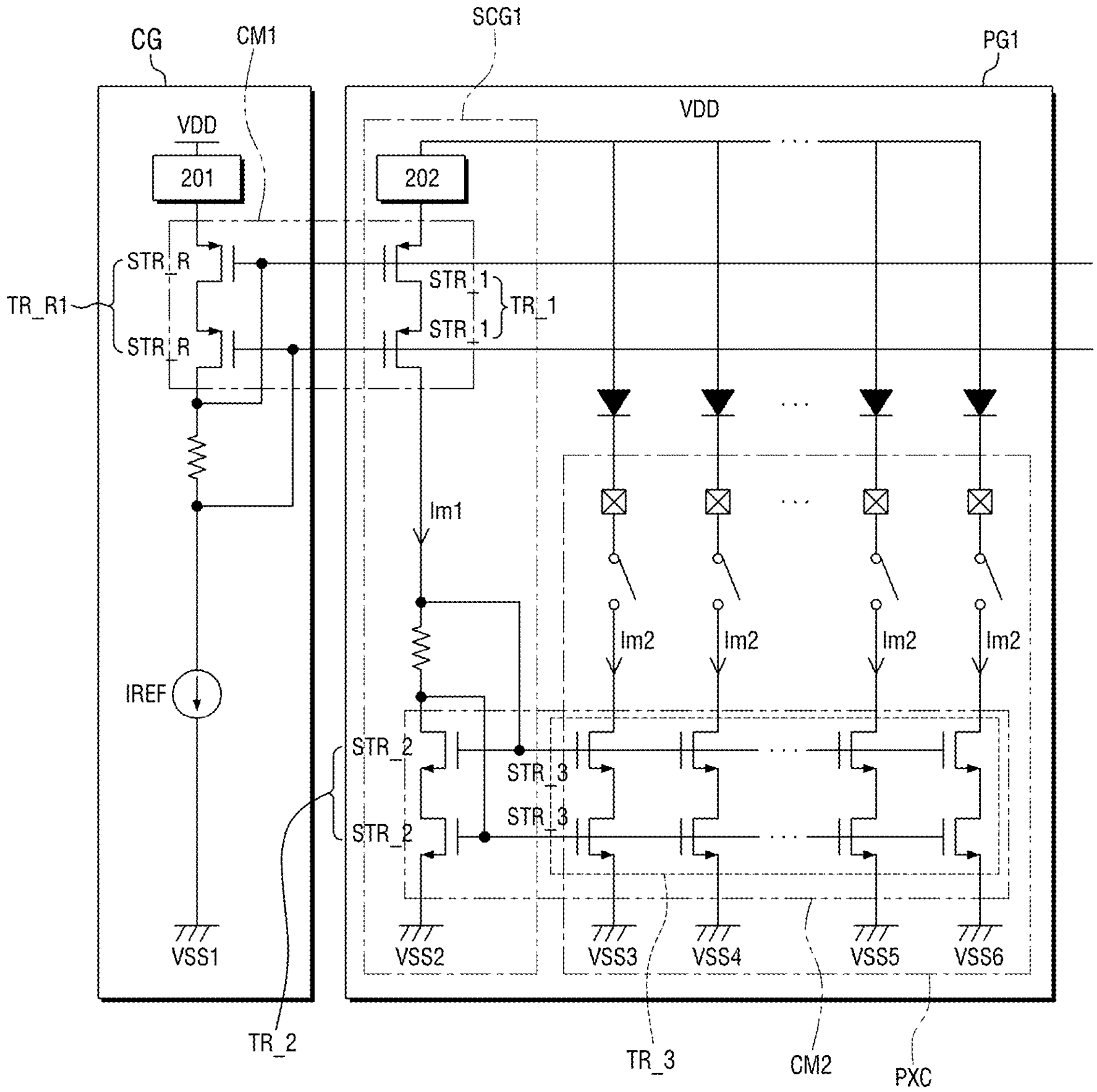

FIGS. 11 and 12 are diagrams explaining a display device according to some embodiments of the present disclosure, and show circuit diagrams corresponding to the reference current source and the first pixel group of FIG. 2. For clarity of explanation, explanations that overlap with what was previously explained with reference to the drawings will be briefly explained or omitted.

Referring to FIGS. 1, 2, and 11, the first transistor TR_1 included in each of the n pixel groups PG may include a plurality of first sub-transistors STR_1 connected in series to each other. Each of the plurality of first sub-transistors STR_1 may be an NMOS transistor.

The first reference transistor TR_R1 may include a plurality of reference sub-transistors STR_R connected in series to each other. Each of the plurality of reference sub-transistors STR_R may be an NMOS transistor.

The plurality of reference sub-transistors STR_R and the plurality of sub-transistors STR_1 may form the first current mirror CM1 with each other.

The second transistor TR_2 included in each of the n pixel groups PG may include a plurality of second sub-transistors STR_2 connected in series to each other. Each of the plurality of second sub-transistors STR_2 may be a PMOS transistor.

Each of the at least one third transistor TR_3 included in each of the n pixel groups PG may include a plurality of third sub-transistors STR_3 connected in series to each other. One pixel may include the plurality of third sub-transistors STR_3. The at least one third sub-transistor STR_3 included in each of the plurality of pixels may be connected to each other. Each of the at least one third sub-transistor STR_3 may be a PMOS transistor.

Each of the n pixel groups PG may include at least one light-emitting element that receives the second mirroring current Im2 provided from each of the at least one third transistor TR_3. One light-emitting element of one pixel may receive the second mirroring current Im2 provided from the plurality of third sub-transistors STR_3.

Each of the first additional circuit 201 and the second additional circuit 202 may include any one of a PMOS transistor and a resistor.

Although FIG. 11 illustrates that the at least one third transistor TR_3 and the at least one light-emitting element included in the first light-emitting element group ED_G1 include only a plurality of third transistors TR_3 and a plurality of light-emitting elements, respectively, but are not limited thereto. In case that one third transistor TR_3 and one light-emitting element are connected to each other, the third transistor TR_3 may also include a plurality of sub-transistors which are connected in series to each other and which are connected to one light-emitting element.

Referring to FIGS. 1, 2, and 12, the first transistor TR_1 included in each of the n pixel groups PG may include a plurality of first sub-transistors STR_1 connected in series to each other. Each of the plurality of first sub-transistors STR_1 may be a PMOS transistor.

The first reference transistor TR_R1 may include a plurality of reference sub-transistors STR_R connected in series to each other. Each of the plurality of reference sub-transistors STR_R may be a PMOS transistor.

The plurality of reference sub-transistors STR_R and the plurality of first sub-transistors STR_1 may form the first current mirror CM1 with each other.

The second transistor TR_R2 included in each of the n pixel groups PG may include a plurality of second sub-transistors STR_2 connected in series to each other. Each of the plurality of second sub-transistors STR_2 may be an NMOS transistor.

Each of the at least one third transistor TR_3 included in each of the n pixel groups PG may include a plurality of third sub-transistors STR_3 connected in series to each other. One pixel may include the plurality of third sub-transistors STR_3. The at least one third sub-transistor STR_3 included in each of the plurality of pixels may be connected to each other. Each of the plurality of third sub-transistors STR_3 may be an NMOS transistor.

Each of the n pixel groups PG may include at least one light-emitting element that receives the second mirroring current Im2 provided from each of the at least one third transistor TR_3. One light-emitting element of one pixel may receive the second mirroring current Im2 provided from the plurality of third sub-transistors STR_3.

Each of the first additional circuit 201 and the second additional circuit 202 may include any one of an NMOS transistor and a resistor.

Although FIG. 11 illustrates that the at least one third transistor TR_3 and the at least one light-emitting element included in the first light-emitting element group ED_G1 include only a plurality of third transistors TR_3 and a plurality of light-emitting elements, respectively, but are not limited thereto. In case that one third transistor TR_3 and one light-emitting element are connected to each other, the third transistor TR_3 may also include a plurality of sub-transistors which are connected in series to each other and which are connected to one light-emitting element.

Figure 13:
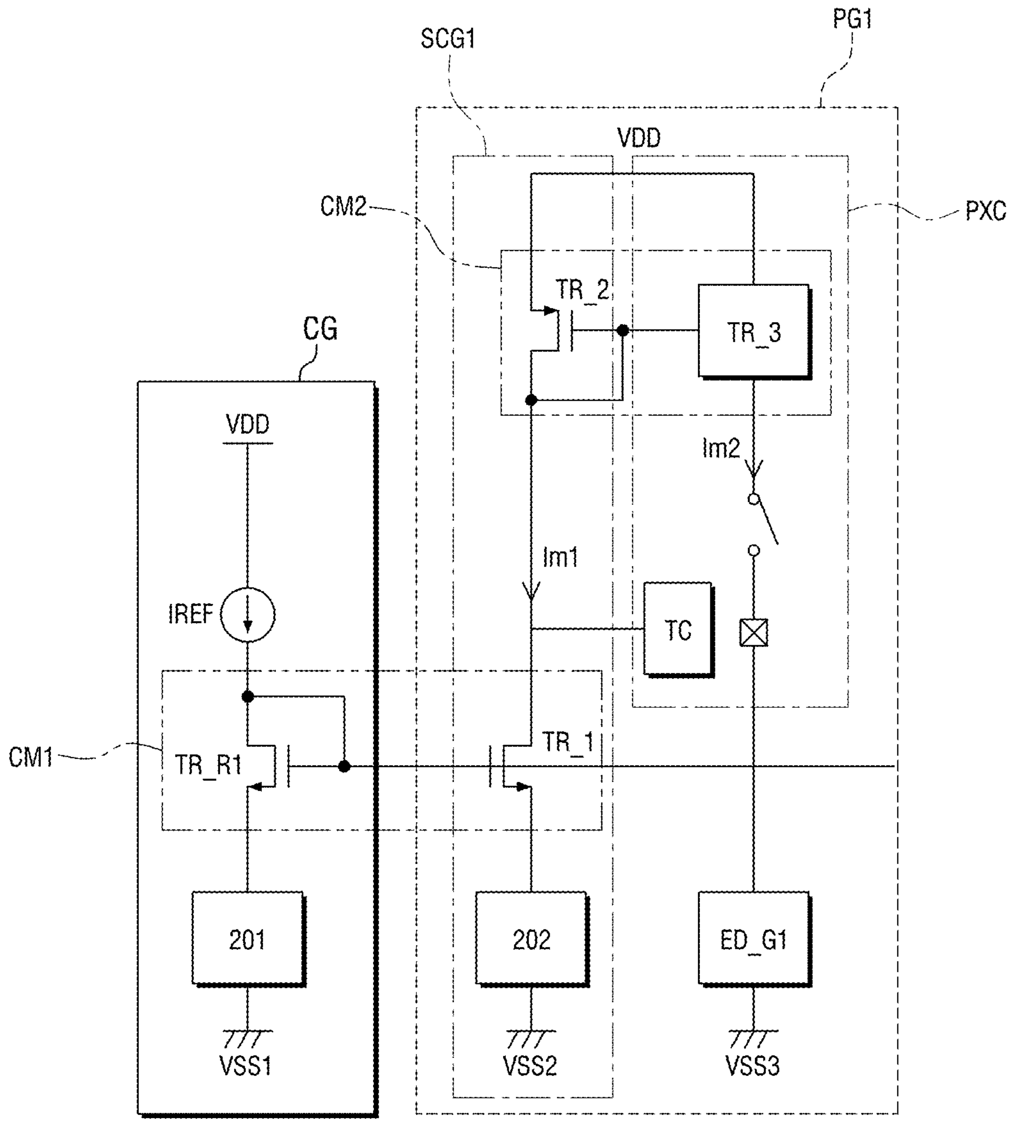
FIG. 13 is a diagram explaining a display device according to some embodiments of the present disclosure, and shows a circuit diagram corresponding to the reference current source and the first pixel group of FIG. 2.

FIG. 13 is a diagram explaining a display device according to some embodiments of the present disclosure, and shows a circuit diagram corresponding to the reference current source and the first pixel group of FIG. 2. For clarity of explanation, explanations that overlap with what was previously explained with reference to the drawings will be briefly explained or omitted.

Referring to FIGS. 1, 2, and 10, each of the n pixel circuits PXC may further include a trimming circuit TC. The trimming circuit TC may be connected to one end of the first transistor TR_1.

If there is a difference between the reference current and the first mirroring current Im1, the trimming circuit TC may enable an additional current as much as the difference to be supplied to the first transistor TR_1. For example, the additional current as much as the difference may be added to the first mirroring current Im1. The difference between the reference current and the first mirroring current Im1 may be, for example, due to the error caused by the process when NMOS and PMOS transistors are manufactured.

Figure 14:
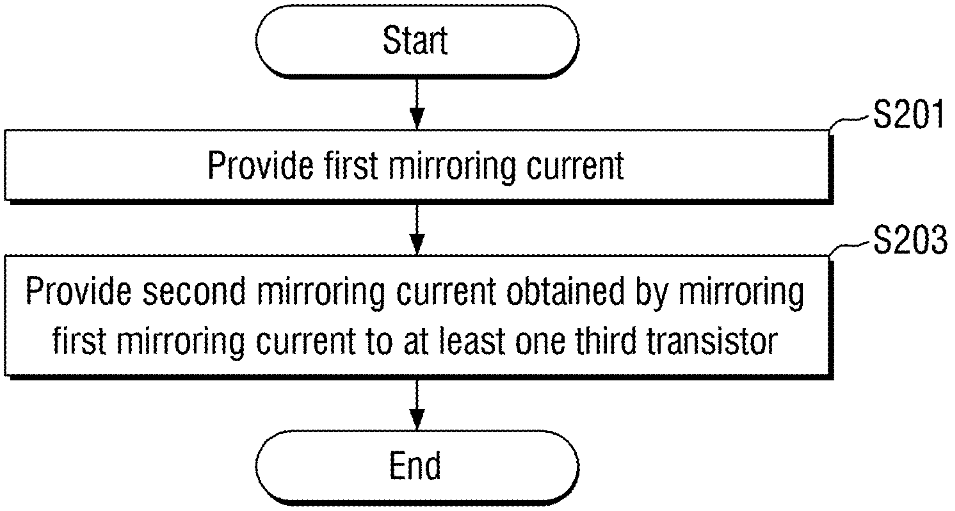
FIG. 14 is a diagram explaining a method for driving a display device according to some embodiments of the present disclosure.

FIG. 14 is a diagram explaining a method for driving a display device according to some embodiments of the present disclosure.

Referring to FIG. 14, a method for driving a display device according to some embodiments of the present disclosure may include a step of providing a first mirroring current (S201).

The first mirroring current may be provided to a first transistor connected to a reference current source through which a reference current flows and an additional circuit connected to the first transistor. The first transistor and the additional circuit may be included in a sub-current source included in each of n pixel groups. The additional circuit may include any one of an additional transistor and an additional resistor. The gate of the additional transistor may be connected to one end of the additional transistor, and thus the additional transistor may operate as a source follower.

The method for driving a display device according to some embodiments of the present disclosure may include a step of providing a second mirroring current obtained by mirroring the first mirroring current to at least one third transistor (S203).

The second mirroring current may be provided by using a second transistor which is connected to the first transistor and through which the first mirroring current flows, and at least one third transistor connected to the second transistor.

The method for driving a display device according to some embodiments of the present disclosure may further include a step of charging a capacitor connected to the gate of the second transistor and the gate of the at least one third transistor by using the second mirroring current in a state where a switch between the first transistor and the second transistor is in a closed state. The method for driving a display device according to some embodiments of the present disclosure may further include a step of changing the switch to an open state after charging the capacitor.

Figure 15:
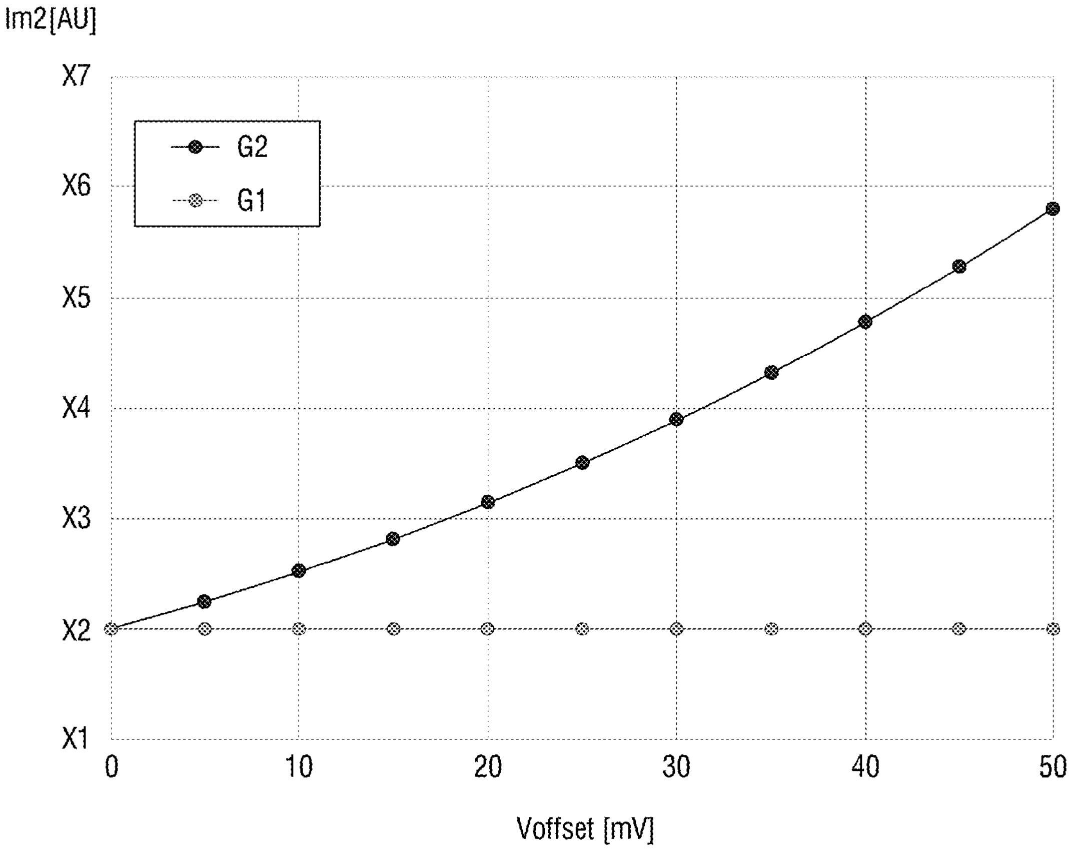
FIG. 15 is a diagram explaining effects of a display device and a driving method thereof according to some embodiments of the present disclosure.

FIG. 15 is a diagram explaining effects of a display device and a driving method thereof according to some embodiments of the present disclosure.

Referring to FIG. 15, the relationship between a difference Voffset between a plurality of common voltages (e.g., VSS1 to VSS3 of FIG. 3) and the second mirroring current Im2, depending on whether the display device includes the first additional circuit and the second additional circuit, can be known.

A first graph G1 is a graph in case that the display device, such as the display device according to some embodiments of the present disclosure, includes the first additional circuit and the second additional circuit, and a second graph G2 is a graph in case that the display device does not include the first additional circuit and the second additional circuit. In the graphs, x-axis represents a difference Voffset (in the unit of mV) between the plurality of common voltages (e.g., VSS1 to VSS3 of FIG. 3), and y-axis represents the second mirroring current Im2 (in arbitrary units (AU)).

It can be known that, in case of the first graph G1, the second mirroring current Im2 is constant even if the difference between the plurality of common voltages (e.g., VSS1 to VSS3 of FIG. 3) is increased, whereas, in case of the second graph G2, the second mirroring current Im2 is changed according to the difference between the plurality of common voltages (e.g., VSS1 to VSS3 of FIG. 3).

Since the display device according to some embodiments of the present disclosure includes the first additional circuit and the second additional circuit, the second mirroring current Im2 is minimally affected by the difference between the plurality of common voltages (e.g., VSS1 to VSS3 of FIG. 3), and thus it is possible to secure the stability and reliability of the circuit and to supplement the voltage drop.

Figure 16:
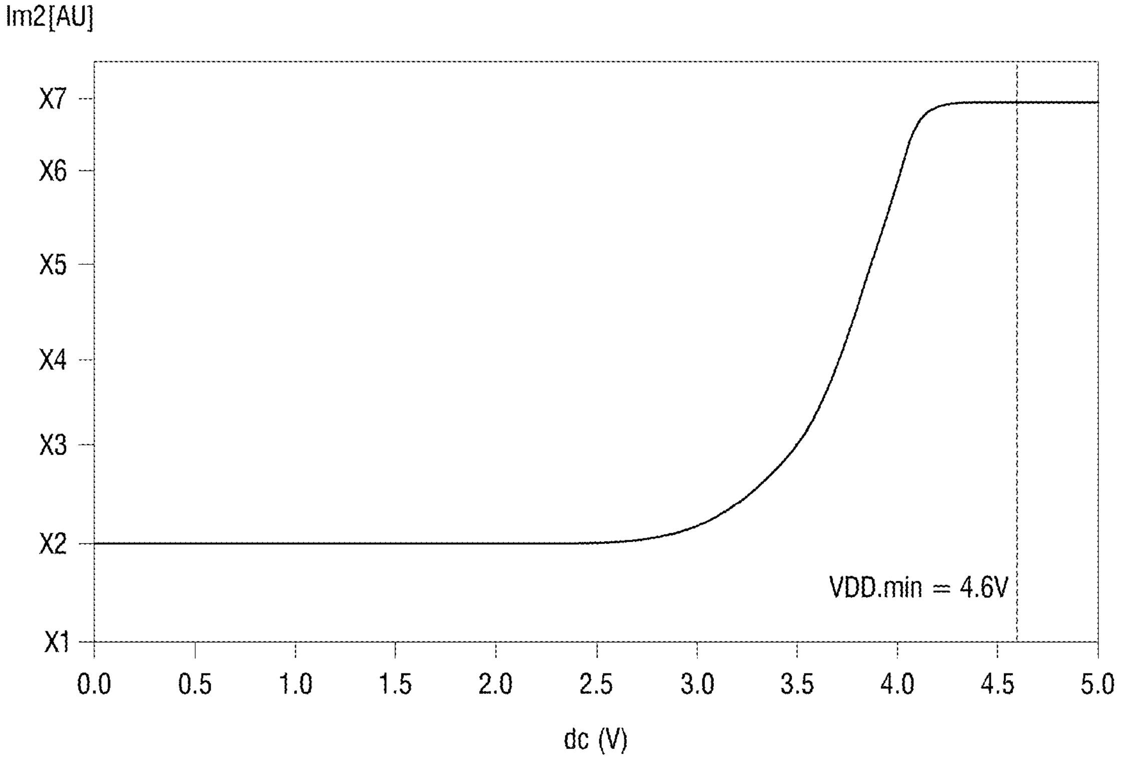
FIGS. 16 and 17 are diagrams explaining effects of a display device and a driving method thereof according to some embodiments of the present disclosure.
Figure 17:
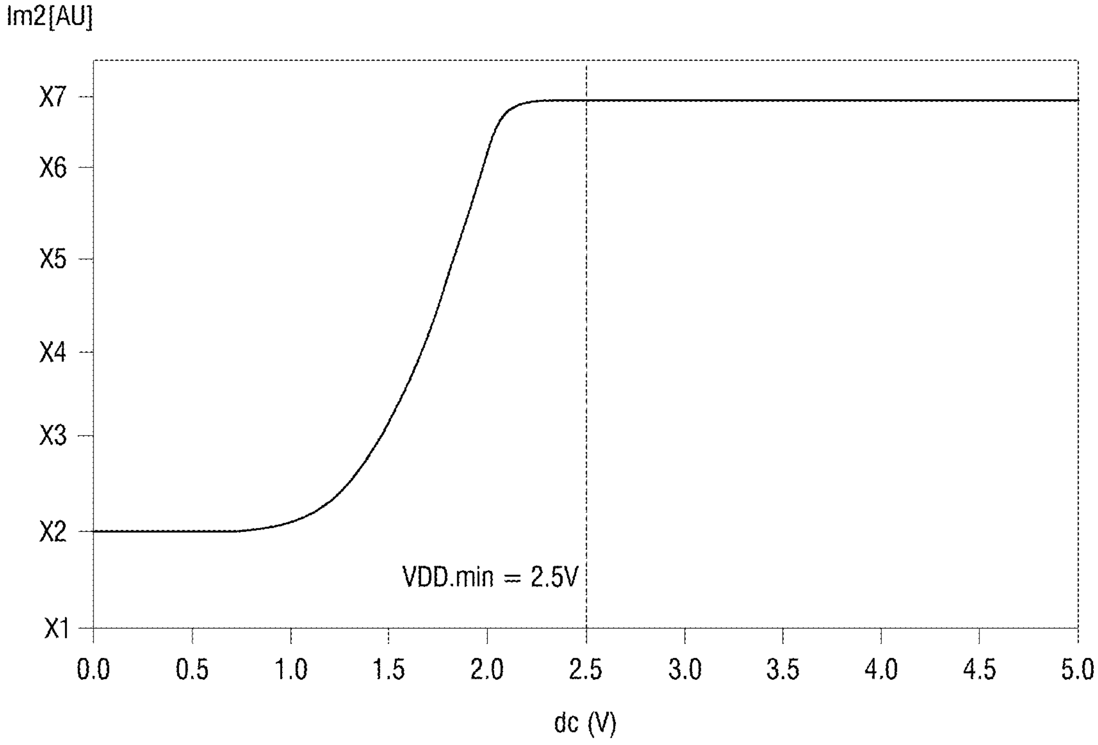

FIGS. 16 and 17 are diagrams explaining effects of a display device and a driving method thereof according to some embodiments of the present disclosure.

Referring to FIGS. 16 and 17, in case that the display device includes a second additional circuit 202 (of FIG. 3), the power required to drive the light-emitting element according to the connection location of the second additional circuit can be known. The graph of FIG. 16 represents a case where the second additional circuit is connected to a branch that is the same as that of the light-emitting element, and the graph of FIG. 17 represents a case where the second additional circuit is connected to a branch that is different from that of the light-emitting element as in the display device according to some embodiments of the present disclosure.

In the graphs of FIGS. 16 and 17, x-axis represents a power voltage (in the unit of V) for driving the light-emitting element, and y-axis represents the second mirroring current Im2 (in arbitrary units (AU)).

It can be known that the minimum power voltage VDD·min for driving the light-emitting element in case that the second additional circuit of FIG. 16 is connected to the branch that is the same as that of the light-emitting element is higher than the minimum power voltage VDD·min for driving the light-emitting element in case that the second additional circuit is connected to the branch that is different from that of the light-emitting element as in the display device according to some embodiments of the present disclosure of FIG. 17.

In the display device according to some embodiments of the present disclosure, since the second additional circuit is connected to the branch that is different from that of the light-emitting element, the influence of the voltage that is required to drive the additional circuit can be minimized, and thus the voltage according to the driving of the light-emitting element can be lowered.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A display device comprising:

a pixel array including n pixel groups, wherein n is a number of the n pixel groups;

a reference current source including a first reference transistor through which a reference current flows and connected to the pixel array;

n sub-current sources each included in the n pixel groups and each including a first transistor connected to the reference current source; and n pixel circuits connected to the n sub-current sources, respectively, wherein the reference current source includes any one of a second reference transistor and a reference resistor connected to the first reference transistor, wherein each of the n sub-current sources is configured to provide a first mirroring current obtained by mirroring the reference current, wherein each of the n pixel circuits is configured to provide a second mirroring current obtained by mirroring the first mirroring current, wherein each of the n sub-current sources includes any one of an additional transistor and an additional resistor connected to the first transistor, and wherein n is a natural number.

2. The display device of claim 1, wherein a first end of the second reference transistor is connected to the first reference transistor, wherein a gate of the second reference transistor is connected to a second end of the second reference transistor, wherein a first end of the additional transistor is connected to the first transistor, and wherein a gate of the additional transistor is connected to a second end of the additional transistor.

3. The display device of claim 1, wherein each of the n pixel groups comprises at least one light-emitting element, and wherein the at least one light-emitting element of each of the n pixel groups is connected to each of the n pixel circuits.

4. The display device of claim 3, wherein the second mirroring current is provided to each of the at least one light-emitting element.

5. The display device of claim 1, wherein a first pixel group among the n pixel groups comprises a first sub-current source among the n sub-current sources and a first pixel circuit among the n pixel circuit, wherein the first sub-current source includes a second transistor connected to one end of the first transistor, wherein the first pixel circuit further includes at least one third transistor, the at least one third transistor connected to the second transistor and configured to provide the second mirroring current, and wherein the first transistor is configured to provide the first mirroring current.

6. The display device of claim 5, wherein the first pixel group comprises at least one light-emitting element connected to each of the at least one third transistor and provided with the second mirroring current.

7. The display device of claim 5, wherein the first transistor comprises a plurality of first sub-transistors connected in series to each other, wherein the second transistor includes a plurality of second sub-transistors connected in series to each other, and wherein each of the at least one third transistor includes at least one third sub-transistor connected in series to each other.

8. The display device of claim 7, wherein the first pixel group comprises at least one light-emitting element connected to each of the at least one third transistor and provided with the second mirroring current, and wherein a first light-emitting element included in the at least one light-emitting element is connected to the at least one third sub-transistor and is provided with the second mirroring current.

9. The display device of claim 5, further comprising:

a capacitor connected to a gate of the second transistor and a gate of the at least one third transistor; and a switch between the first transistor and the second transistor.

10. The display device of claim 9, wherein the switch is configured to be changed from a closed state to an open state after the capacitor is charged by using the second mirroring current.

11. The display device of claim 1, further comprising a trimming circuit configured to enable an additional current as much as a difference between the reference current and the first mirroring current to be supplied to the first transistor.

12. A display device comprising:

a first pixel circuit connected to a first light-emitting element group;

a first sub-current source connected to the first pixel circuit;

a second pixel circuit connected to a second light-emitting element group;

a second sub-current source connected to the second pixel circuit; and a reference current source including a first reference transistor through which a reference current flows and which is connected to each of the first sub-current source and the second sub-current source, wherein each of the first sub-current source and the second sub-current source includes a first transistor connected to the first reference transistor and is configured to provide a first mirroring current obtained by mirroring the reference current, wherein each of the first pixel circuit and the second pixel circuit provides a second mirroring current obtained by mirroring the first mirroring current, wherein the reference current source includes any one of a second reference transistor and a reference resistor connected to the first reference transistor, and wherein each of the first sub-current source and the second sub-current source includes any one of an additional transistor and an additional resistor connected to the first transistor.

13. The display device of claim 12, wherein a first end of the second reference transistor is connected to the first reference transistor, wherein a gate of the second reference transistor is connected to a second end of the second reference transistor, wherein a first end of the additional transistor is connected to the first transistor, and wherein a gate of the additional transistor is connected to a second end of the additional transistor.

14. The display device of claim 12, wherein each of the first light-emitting element group and the second light-emitting element group comprises at least one light-emitting element.

15. The display device of claim 14, wherein the second mirroring current is provided to each of the at least one light-emitting element.

16. The display device of claim 12, wherein each of the first sub-current source and the second sub-current source comprises a second transistor connected to one end of the first transistor, wherein each of the first pixel circuit and the second pixel circuit further includes at least one third transistor which is connected to the second transistor and configured to provide the second mirroring current, and wherein the first transistor is configured to provide the first mirroring current.

17. The display device of claim 16, wherein each of the first light-emitting element group and the second light-emitting element group comprises at least one light-emitting element connected to each of the at least one third transistor and provided with the second mirroring current.

18. The display device of claim 16, wherein the first transistor comprises a plurality of first sub-transistors connected in series to each other, wherein the second transistor includes a plurality of second sub-transistors connected in series to each other, and wherein each of the at least one third transistor includes at least one third sub-transistor connected in series to each other.

19. The display device of claim 18, wherein each of the first light-emitting element group and the second light-emitting element group comprises at least one light-emitting element connected to each of the at least one third transistor and provided with the second mirroring current, and wherein a first light-emitting element included in the at least one light-emitting element is connected to the at least one third sub-transistor and is provided with the second mirroring current.

20. The display device of claim 16, further comprising:

a capacitor connected to a gate of the second transistor and a gate of the at least one third transistor; and a switch between the first transistor and the second transistor.

21. The display device of claim 20, wherein the switch is configured to be changed from a closed state to an open state after the capacitor is charged by using the second mirroring current.

22. The display device of claim 12, further comprising a trimming circuit configured to enable an additional current as much as a difference between the reference current and the first mirroring current to be supplied to the first transistor.

23. A display device comprising:

a pixel array including n pixel groups;

a reference current source including a first reference transistor through which a reference current flows and which is connected to the pixel array;

n sub-current sources each included in the n pixel groups and each including a first transistor connected to the reference current source; and n pixel circuits included in each of the n pixel groups and connected to the n sub-current sources, respectively, wherein the reference current source includes any one of a second reference transistor and a reference resistor connected to the first reference transistor, wherein each of the n sub-current sources includes:

the first transistor that forms a first current mirror together with the first reference transistor; and any one of an additional transistor and an additional resistor connected to the first transistor, and wherein each of the n sub-current sources or each of the n pixel circuits includes a second current mirror connected to the first transistor.

24. The display device of claim 23, wherein a first end of the second reference transistor is connected to the first reference transistor, wherein a gate of the second reference transistor is connected to a second end of the second reference transistor, wherein a first end of the additional transistor is connected to the first transistor, and wherein a gate of the additional transistor is connected to a second end of the additional transistor.

25. The display device of claim 23, wherein the second current mirror comprises:

a second transistor connected to one end of the first transistor; and at least one third transistor connected to the second transistor.

26. The display device of claim 25, wherein each of the n pixel groups comprises at least one light-emitting element connected to each of the at least one third transistor.

27. The display device of claim 25, wherein the first transistor comprises a plurality of first sub-transistors connected in series to each other, wherein the second transistor includes a plurality of second sub-transistors connected in series to each other, and wherein each of the at least one third transistor includes at least one third sub-transistor connected in series to each other.

28. The display device of claim 25, further comprising:

a capacitor connected to a gate of the second transistor and a gate of the at least one third transistor; and a switch between the first transistor and the second transistor.

29. The display device of claim 28, wherein the switch is configured to be changed from a closed state to an open state after the capacitor is charged by using the second mirroring current.

30. The display device of claim 23, wherein a first mirroring current obtained by mirroring the reference current is configured to be provided to the first transistor and the second current mirror by the first current mirror, and wherein a second mirroring current obtained by mirroring the first mirroring current is configured to be generated by the second current mirror.

31. The display device of claim 30, wherein each of the n pixel groups comprises at least one light-emitting element, wherein the at least one light-emitting element of each of the n pixel groups is connected to the second current mirror, and wherein the second mirroring current is provided to the at least one light-emitting element.

32. The display device of claim 23, further comprising a trimming circuit configured to enable an additional current as much as a difference between the reference current and the first mirroring current to be supplied to the first transistor.

33. A method for driving a display device, comprising:

providing a first mirroring current obtained by mirroring a reference current to a first transistor connected to a reference current source through which the reference current flows and an additional circuit connected to the first transistor; and providing a second mirroring current obtained by mirroring the first mirroring current to at least one third transistor by using a second transistor which is connected to the first transistor and through which the first mirroring current flows and the at least one third transistor connected to the second transistor, wherein the additional circuit includes any one of an additional transistor and an additional resistor.

34. The method of claim 33, further comprising connecting a first end of the additional transistor to the first transistor and connecting a gate of the additional transistor to a second end of the additional transistor.

35. The method of claim 33, further comprising:

charging a capacitor connected to a gate of the second transistor and a gate of the at least one third transistor by using the second mirroring current in a state where a switch between the first transistor and the second transistor is closed; and changing the switch to an open state after charging the capacitor.

* * * * *